United States Patent

Tong et al.

[11] Patent Number: 5,579,232
[45] Date of Patent: Nov. 26, 1996

[54] SYSTEM AND METHOD INCLUDING NEURAL NET FOR TOOL BREAK DETECTION

[75] Inventors: David W. Tong, Scotia; Kenneth M. Martin, Clifton Park, both of N.Y.; Jerry H. Carmichael, Westchester; Edward N. Diei, Cincinnati, both of Ohio

[73] Assignee: General Electric Company, Schenectady, N.Y.

[21] Appl. No.: 401,333

[22] Filed: Mar. 9, 1995

Related U.S. Application Data

[63] Continuation of Ser. No. 38,440, Mar. 29, 1993, abandoned.

[51] Int. Cl.[6] ............................................ G06F 19/00
[52] U.S. Cl. ............... 364/474.17; 364/554; 364/474.15; 395/22; 340/683
[58] Field of Search .................. 364/474.15–474.21, 364/148, 551.01, 551.02, 554; 395/902–906, 22, 23, 50, 54, 60, 77; 340/680, 683

[56] References Cited

U.S. PATENT DOCUMENTS

| | | | |
|---|---|---|---|
| 4,631,683 | 12/1986 | Thomas et al. | 364/474 |
| 4,636,779 | 1/1987 | Thomas et al. | 340/680 |
| 4,642,617 | 2/1987 | Thomas et al. | 340/680 |
| 4,663,678 | 5/1987 | Thomas et al. | 340/680 |
| 4,707,687 | 11/1987 | Thomas et al. | 340/680 |
| 4,707,688 | 11/1987 | Thomas | 340/680 |
| 4,724,524 | 2/1988 | Thomas et al. | 364/474 |
| 4,806,914 | 2/1989 | Thomas et al. | 340/680 |
| 4,849,741 | 7/1989 | Thomas | 340/683 |
| 4,853,680 | 8/1989 | Thomas | 340/680 |
| 4,918,427 | 4/1990 | Thomas et al. | 340/680 |
| 5,251,144 | 10/1993 | Ramamurthi | 364/474.19 |
| 5,283,418 | 2/1994 | Bellows et al. | 395/22 X |
| 5,359,699 | 10/1994 | Tong et al. | 395/23 |
| 5,402,521 | 3/1995 | Niida et al. | 395/22 |
| 5,407,265 | 4/1995 | Hamidieh et al. | 364/474.17 X |

OTHER PUBLICATIONS

"Automatic Tool Touch and Breakage Detection in Turning", S. R. Hayashi, C. E. Thomas, R. K. Davis, W. S. McKnight & C. R. Roberts, GE Corp. Res. & Dev.—TIS Report No. 85CRD097, Jun. 1985, pp. 1–12.

Primary Examiner—Paul P. Gordon
Assistant Examiner—Brian C. Oakes
Attorney, Agent, or Firm—David C. Goldman; Marvin Snyder

[57] ABSTRACT

A system and method for monitoring vibrations of a cutting tool uses a neural network for classifying signal features as break or non-break or, in another embodiment, as non-break or abnormal. A vibration signal is produced by an accelerometer, positioned to sense vibrations at the tool-workpiece interface. The signal is pre-processed to extract low frequency machining noise and detect the energy in a higher frequency band. The signal is then sampled and segments of the digitized signals are processed by digital logic into feature vectors for input to a trained neural net having two output nodes for classification. The use of a neural net provides performance improvement and economies over previously known heuristic methods of signal analysis.

7 Claims, 1 Drawing Sheet

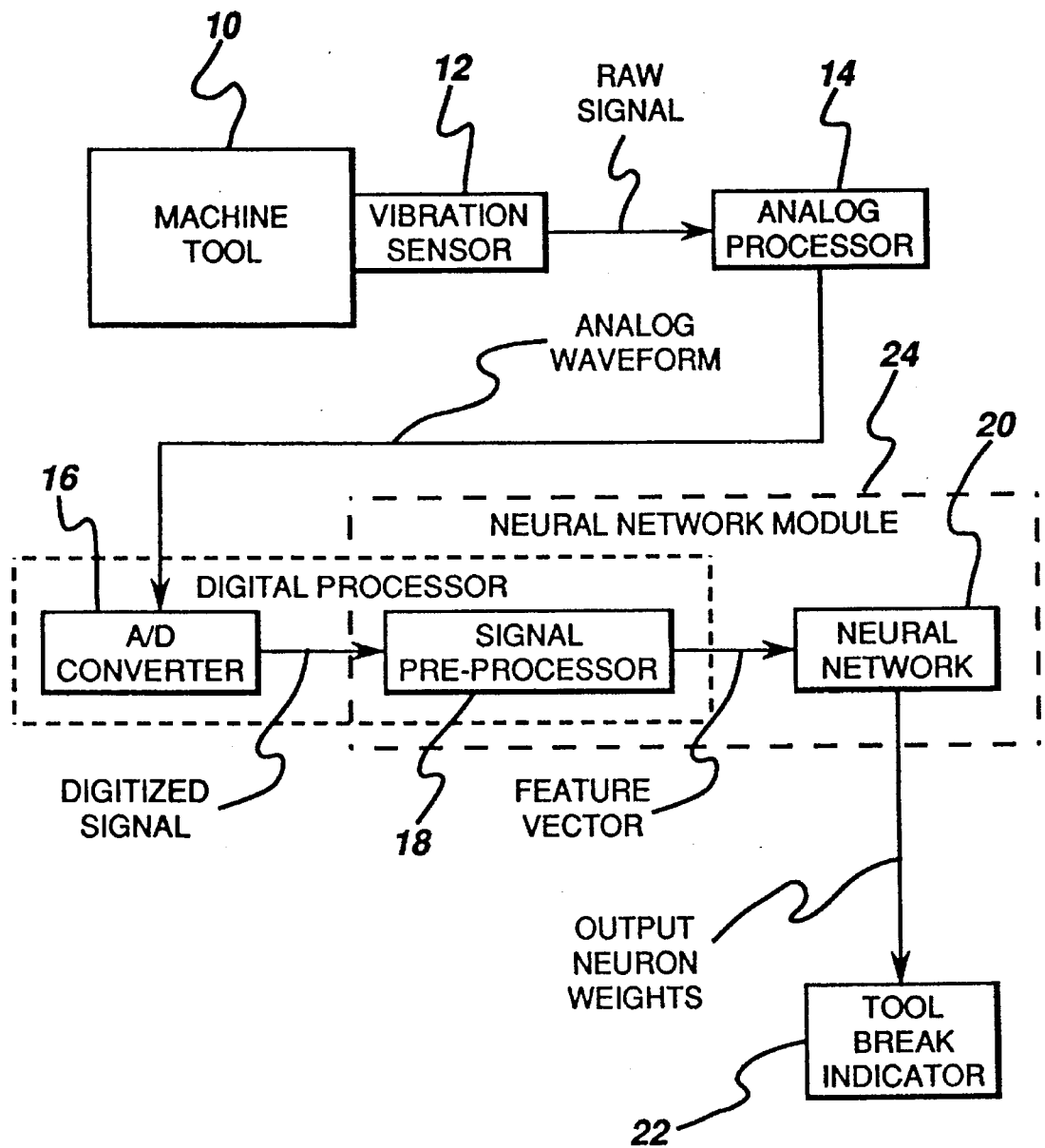

SYSTEM AND METHOD INCLUDING NEURAL NET FOR TOOL BREAK DETECTION

This application is a continuation of application Ser. No. 08/038,440 filed 29 Mar., 1993 now abandoned.

BACKGROUND OF THE INVENTION

This invention relates to a tool break detector system and to a method of monitoring cutting tool vibrations to detect tool breakage and to prevent false alarms on other vibration noise occurring during normal cutting.

Automation in the factory has advanced to a point where machining is often done without manual supervision. Tool breakage, however, has increasingly become a problem because a broken tool can damage an expensive workpiece if cutting is not quickly discontinued. In response to this problem, systems have been developed to monitor the status of the cutting tool, typically by the use of a sensor, such as an accelerometer, mounted near the tool in order to sense vibration and to automatically terminate cutting when tool breakage occurs. Tool breakage, or break event, detection is a problem of recognizing break patterns in the sensor signals and thus involves the extraction of pertinent features from the signals and then classifying the feature vector as either break or non-break. Prior art tool break detection systems handle this recognition problem through careful manual analysis of the available signals by which a set of heuristics is developed. These heuristics, or rules, are then translated into microprocessor based amplitude-time domain pattern recognition techniques for spotting those signal patterns which are found to accompany a tool break event.

An example of one such heuristic approach is U.S. Pat. No. 4,636,779, which discloses a tool break detection system wherein sampled vibration signals are digitized and processed via either digital circuitry or a programmable general purpose computer containing the logic for detecting break events. In the '779 patent, this digital circuitry or software calculates a running mean signal level of a selected number of signal samples. A transient detector compares every new sample with the running mean signal value of N previous samples to detect a transient or abrupt increase in signal level that may have its source in a major tool break event. A mean shift detector then compares the mean signal level after and before such a transient to detect a shift in mean level and thus a substantial change in background cutting noise. A mean shift persistence detector makes a check that the shift in mean level persists for a specified time period. Various other commonly assigned patents (U.S. Pat. Nos. 4,642,617; 4,636,780; 4,707,787; 4,724,524; 4,806,914; 4,849,741; 4,853,680; and 4,918,427) improve on and modify this algorithm for various reasons as explained therein, but all of these systems are alike in that expert developed heuristics are crucial to being able to discriminate normal cutting events from tool break events and these heuristics are never as accurate as one would like them to be.

The challenge of the tool break detection problem therefore lies in the inherently noisy and variable signals in which no simple characteristic can be found which accurately discriminates tool breakage from other normal cutting events. Another challenge presented by the detection problem is the relative scarcity of break data as compared with normal cutting data. Breaks occur randomly and infrequently so that capturing break data can be a costly and involved process. A break detection system which could provide improved detection sensitivity and lower false alarm rates and could be easily adapted for use with new tool types and cutting tasks would be desirable. Furthermore, since break data is scarce and difficult and costly to obtain especially for new tool types and cutting tasks, a system which does not depend on such break data would be especially desirable.

SUMMARY OF THE INVENTION

An object of the present invention is to improve upon the performance of previous machine tool monitors.

Another object is to make effective use of multiple signal features for identifying tool break events which leads to improved accuracy and false alarm rates.

A further object of the invention is to utilize the inherent capabilities of neural networks for automated learning of decision criteria by training on data and fast algorithm development and easy updating through training.

A still further object of the invention is to provide methods for training a neural network for abnormality detection using only non-break data.

An improved machine tool break detection system according to a preferred embodiment has a means for generating electrical signals of vibrations occurring at the interface of the machine and a workpiece. An analog signal processor produces an energy-versus-time waveform from these signals. A digital processor has means for sampling and digitizing these waveforms and calculating various features of the digitized signals. These features are generated in the form of a feature vector for input to a trained neural net. The neural net can be trained using these same features using known techniques or it can be trained using feature data for non-break events only, using a novel technique called Biased Data Training. The features may be a subset of features chosen from among means, standard deviations, and slopes of these values within windows of the magnitude of the digitized signal patterns. The system may further include means for indicating break events upon the classification of a given feature input by the neural net as a break or abnormal event.

BRIEF DESCRIPTION OF THE DRAWINGS

The sole FIGURE is a block diagram of the present invention.

DETAILED DESCRIPTION OF THE INVENTION

The sole FIGURE is a block-diagram of the present invention. The machine tool monitor described in U.S. Pat No. 4,636,779, incorporated herein in its entirety, uses the same sensor and analog signal processing as the present invention. The present invention includes a novel neural network module, shown as 24 in the sole FIGURE, which has a neural net and some additional digital processing to prepare the inputs to the neural net. While neural nets are well known, they have not to the inventors' knowledge been heretofore used in monitoring for machine tool breaks.

Still referring to the FIGURE, a machine tool 10 is shown having a vibration sensor 12, which may be an accelerometer, mounted to it. Sensor 12 generates electrical signals representing vibrations at the tool-workpiece interface. The mounting location of vibration sensor 12 is determined individually for each machine tool to be monitored. The considerations are the same as for touch tool detectors and are fully explained in U.S. Pat. No. 4,631,683, incorporated herein in its entirety. Analog processor 14 filters the raw accelerometer signal output and generates an analog waveform proportional to the amplitude of vibrations in the chosen band. Modern accelerometers with built in signal conditioning are very convenient to use, inexpensive and rugged. They also operate in a frequency range that allows relatively remote placement from the cutting region while maintaining adequate signal level. Preferably the accelerometer would have a useable response from 1 Hz to 70 KHz. Sensor 12 has a broadband response that analog processor 14 bandpass filter restricts. An energy detector consisting of a full-wave rectifier and a 500 Hz low pass anti-aliasing filter produces the signal energy-versus-time analog waveform. It also has a digitally controlled gain stage to keep signals within the dynamic range of the system. Analog-to-digital converter 16 samples the waveform from processor 14 and passes the amplitude of these samples to signal pre-processor 18 of neural network module 24. In one embodiment, neural network module 24 screens the sampled signal for alerting spikes which initiate a feature extraction process by signal pre-processor 18 and subsequent network classification by neural net 20. In cases where alerting spikes are not present, the signal can be analyzed without regard to such spikes. The response time of the module has been tested and found to be fast enough to handle 250 alerting events per second. These will be discussed in more detail below. Neural net 20 classifies a given set of features (hereinafter referred to as a feature vector) as either break or non-break. Neural net 20 may be either a classifier net or an abnormality detection net to be described hereinbelow. Break events are indicated on tool break indicator 22. Tool break indicator 22 is preferably an alarm but may be any type of device for alerting an operator of a tool break, such as an alarm coupled with a visual indication such as a flashing light. The use of neural net 20 in the present invention is a significant improvement over prior art tool break detection systems. As explained in the background section, these prior art systems suffer from their reliance on expert developed heuristics which are never truly accurate and must undergo changes in order to accommodate new situations. Neural networks have the ability to handle multiple input features and can be rapidly trained and evaluated. Of the many types of neural nets which exist, the Multi-Layer-Perception (MLP) is the preferred type because of its ease of implementation and speed in recognition. A novel training method described hereinbelow in the section entitled "Biased Data Training Method", can be advantageously used to train the neural net in the present invention using only non-break cutting data. This is an enormous benefit since break data is so scarce. The MLP is a multiple layer feedforward network without feedback. The weights are typically determined by the Backpropagation algorithm or a variant thereof. The specific weight determining method is not critical to the present invention. Neural net 20 may be either a classifier as is known in the art or an abnormality detector as described in the section on Biased Data Training. The architecture of the MLP is preferably a 3-layer network with an input layer, hidden layer, and output layer. The input layer contains enough nodes to accept the feature vector as created by pre-processor 18. The output layer contains two nodes representing "non-break" and either "break" for the classifier, or "abnormal", for the abnormality detector. The hidden layer contains a variable number of nodes as determined by training trials. Two hidden nodes are found adequate for the classifier and ten for the abnormality detector.

Pre-processing of the digitized signals for feature extraction by digital processor 18 will now be described. It will be appreciated that the present invention is not limited to any type of tool, or any type of signal patterns emanating from the tool. Although one embodiment of the present invention for carbide tools will be described, the disclosed methods for identifying pertinent signal features to use is generally applicable to other types of tools. Initial selection of signal features will necessarily depend on expert experience of what have been found to be good indicators of tool break events. The key to the use of neural nets is that the expert need not understand how a particular set of signal features interact to indicate a tool break. This information is embedded in the neural net after appropriate training.

For carbide tools it is known that a break event is always accompanied by a spike in the signal. The spike itself is not a reliable break indicator because many other events also cause spikes. It is however, useful as a marker to initiate further analysis. The presence of a spike above a given level is considered an alert event by pre-processor 18. The signal adjacent to the spike is then processed and the extracted features passed to neural net 20 for classification. The accelerometer signal may be further processed into two signals representing the high and low frequency components, hereinafter referred to as UE (for ultrasonic energy) and LF (for low frequency) signals respectively. The UE signal consists of the envelope of the high frequency component from 20 KHz–70 KHz, and the LF signal contains the low-pass filtered component from 1 Hz to 500 Hz. It should be appreciated that the operation of the present invention is not dependent on the presence of spikes in the signals, but instead, features may be extracted throughout the signal. Limiting the neural net inputs to a window containing a spike is merely a more efficient method of operation in cases where a spike will always accompany a break. Likewise, the use of LF and UE signals as described does not limit the present invention. As will be described next, the particular signals and features selected for training the neural net are selected based on experimentation and is largely a subjective decision. Time domain characteristics are generally preferably since use of frequency domain characteristics is hampered by a low-quality power density spectra due to large amounts of noise and to the fact that system time response requirements severely limit the number of sample points. The following features may be extracted for each of the LF and UE signals:

1. mean value within window preceding spike
2. slope of the mean value within window preceding spike
3. standard deviation within window preceding spike
4. slope of the standard deviation within window preceding spike
5. amplitude of the spike
6. mean value within window following spike
7. slope of the mean value within window following spike
8. standard deviation within windows following spike
9. slope of the standard deviation within windows following spike Data for training the neural net may be obtained by using a system such as disclosed in U.S. Pat. No. 4,636,779, and capturing files of digitized data for the UE and LF signals when a break alarm is triggered by a heuristic algorithm such as one described earlier. The files which are associated with an actual break (manually confirmed) are scanned by an expert to determine the actual location of the break event. Because not all breaks may be detected by the heuristic algorithm, the data will not constitute statistically random samples and will reflect any bias within the heuristic algorithm used. The files might constitute, for example, a 20 sec. time period. Within each such time period there would typically be many spikes. For each spike, both break and non-break, the sets of features listed above are extracted to form a feature vector set for training the neural net. Although good classification results could be obtained using all of the features listed above, it is useful to eliminate those features that either carry redundant information or do not help in classification. Lowering the number of features reduces the amount of feature extraction processing time and, more importantly, reduces the training data needed. Various methods may be used to rank the features in terms of usefulness. Some of these methods are as follows:

1. Build-up method: The feature set is "built up" by incrementally adding the one feature that results in the greatest classification improvement. In the first step, the best single feature for classification is found. Then each of the other features is tested with the first feature and the pair with the best result is kept, and so on. The earlier a feature is selected for keeping, the better it is assumed to be.

2. Strip-down method: The feature set is "stripped down" by removing one feature at a time. Starting with all features, classification performance is tested by removing one of the features, and the one resulting in the smallest performance degradation is then left out for the next strip-down step. The earlier a feature is removed, the poorer it is assumed to be.

3. Weight relevance: The method relies on the vector of weights attached to each of the input nodes of a neural network trained with all initial features. The feature associated with the smallest weight vector magnitude is assumed to be the least relevant to the classification.

4. Exhaustive search: All combinations of features are tested for best classification. This method is the most reliable for a given amount of data, but is also the most computation intensive. The method is feasible in this case only because of the small number of features involved. The best combination of features are found for networks using different numbers of input features, from one to all features. Features can then be ranked by assuming that those used by more networks are more useful.

The following table shows the ranking of the UE signal feature set using the first 3 methods:

| | Ranking of UE Signal Features | | |
|---|---|---|---|
| Rank | Build-up | Strip Down | Weight Relevance |
| 1 | 6 | 2 | 6 |
| 2 | 7 | 4 | 3 |
| 3 | 5 | 3 | 1 |
| 4 | 9 | 1 | 4 |
| 5 | 8 | 6 | 2 |
| 6 | 4 | 5 | 8 |
| 7 | 2 | 8 | 5 |
| 8 | 3 | 7 | 7 |
| 9 | 1 | 9 | 9 |

Using the exhaustive search method, the following best feature sets are found:

| Features found Using Exhaustive Search | |
|---|---|
| No. of features used | Features selected |
| 1 | 2 |
| 2 | 3, 6 |
| 3 | 3, 6, 8 |
| 4 | 1, 3, 6, 8 |
| 5 | 1, 2, 3, 6, 8 |
| 6 | 1, 2, 3, 4, 6, 8 |
| 7 | 1, 3, 6, 7, 8, 9 |
| 8 | 1, 2, 3, 4, 6, 7, 8, 9 |
| 9 | all 9 |

Using this table, if the feature usefulness is measured by the number of best networks it appears in, then the ranking of 3, 6, 8, 1, 2, 4, 9, 7, 5 results. Comparing this result with the ranking in the first table, no clear cut consensus emerges from the various methods. Probably the only situation that the various methods would agree on is when the data features are totally uncorrelated with each other, which happens rarely in practice. Nevertheless, it can be observed from both tables that certain features are consistently ranked highly, e.g., 6 and 3, while others such as 7 and 9 are consistently low.

Using the ranking tables, the feature set of 1, 2, 3, 6 and 8 may be chosen for subsequent work. The final chosen set, after adding three additional features from the LF signal, consists of the following:

1. mean UE value within window preceding spike
2. slope of the mean UE value within window preceding spike
3. standard deviation of UE within window preceding spike
4. mean UE value within window following spike
5. standard deviation of UE within window following spike
6. standard deviation of LF within window preceding spike
7. standard deviation of LF within window at the spike
8. standard deviation of LF within window following spike It is highly desirable to have a training method which can learn on the normal events and then to distinguish any abnormal events. Such a method can be used to capture real breaks and in time, sufficient break data will be accumulated to train a classifier in the usual way. The following section describes a novel training technique which requires only normal non-break data.

BIASED DATA TRAINING METHOD

Unlike conventional neural network classifiers that learn to distinguish data of different, but known classes, the neural net training method of the present invention learns to discriminate data of known classes from data that are likely to belong to previously unknown classes. The function that the network of the present invention performs can be described as abnormality, or novelty, detection; whereby abnormal, or novel, events are defined to be unlike those presented to the network during training.

For simplicity, the known data is assumed to belong to a single class although the method is applicable to multiple class data sets also.

A neural network trained according to the present invention determines a decision boundary that closely defines the region occupied by the data points of a known given class. The decision boundary can be set in a controlled way to loosely or tightly bound the given data points. The boundary is typically closed but is not necessarily convex. After having formed such a decision boundary, the network can then be tested with arbitrary input vectors. Those that fall outside the decision boundary are designated by the network as different from the data used for training.

The method uses a feed forward neural network. The network inputs are the elements of the input data vector, or data features, and the output nodes represent the output classes, (e.g., normal/abnormal). The neural network is trained by backpropagation of output errors or any one of a variety of related optimization methods, e.g., gradient descent or conjugate gradient (see D.G. Luenberger, Linear & Nonlinear Programming, 2nd ed., Addison-Wesley, Reading, Mass. 1984). The present training algorithm makes three additions to the traditional backpropagation training for classification.

The first difference between classification and boundary determination training is that in the latter, one of the classes is artificially generated. Neural network training for classification needs competing classes of input data to make a reasonable decision boundary. However, in abnormality or novelty detection type problems there is often only one class of data, hereafter called the "inside" data. Therefore, a set of "outside" class data is artificially generated to provide a competing influence to the known inside points. These "pseudo" outside data points can be initially chosen so that either they are randomly distributed within a selected region of the decision space, or they can be more specifically located as discussed below.

In order to insure that the neural network classifies all of the known inside points correctly, the training error term is biased to favor the correct classification of inside points. This second difference takes advantage of the fact that the backpropagation training technique attempts to minimize the total error of the system.

The third difference is that the present method allows error parameter adjustment and multiple training cycles. Since the optimal error term bias and best set of pseudo outside points is not known at the beginning of training, the method iterates through the classification and adjustment process until completion. Completion of the method depends on finding a good boundary solution or determining that the net has converged.

In one of several possible procedures, the method begins with a neural network in some initial state, a set of input data and a net bias parameter set to zero. The N points of known inside data are exactly the points around which the boundary is to be learned. The net bias parameter is the parameter that determines the training bias for errors in the classification, i.e., an inside point classified as outside, or outside point classified as inside. The bias parameter is set to 0 for the first training iteration so the method begins training with unbiased normal classification.

Next pseudo data is generated to represent points different from the inside data. It would be ideal to place the pseudo outside points just outside of the desired boundary. However, that information is not available since that is the problem to be solved. Therefore, pseudo data is chosen so that it overlaps and/or surrounds the inside data. One reasonable choice for the initial pseudo data is to randomly generate them within a bounding hypercube defined so its hypervolume is twice that of the hypercube bounding the inside data.

A random distribution of pseudo data points can occasionally lead to an uneven distribution. In order to provide an average even distribution, the algorithm is repeated multiple times, each time the network is trained to convergence with a new set of pseudo data. This iterative technique reduces irregularities in the boundary due to local concentrations of random data.

Another way to generate an even distribution of pseudo data in a bounding hypercube is to place the points on regular intervals in each dimension. There are two problems with this method however. First, the total number of data points needed to represent the matrix increases exponentially with each additional dimension. Second, the regularity of the grid can force the boundary to have certain undesirable properties such as non-tight boundaries in concave regions and boundaries parallel to grid lines.

A modification of the randomly generated pseudo data allows retention of pseudo data points that appear to be near the boundary. The purpose of this is to push in the boundary closer to the inside points by clustering more outside points near the boundary. A simple method for finding points near the boundary is to calculate a confidence value for each pseudo data point after a particular cycle of training has converged. This confidence value is calculated by subtracting the two network output node values. A small difference denotes a low confidence and a large difference denotes a high confidence of the result. Pseudo data points resulting in low confidence values are estimated to be near the boundary and can be retained for the next training cycle.

Once the inside data is collected and the pseudo data is generated, the data points are presented to the neural network for training.

The net bias parameter can be used in several different ways. The purpose of the bias parameter is to force the error term to reflect the desired boundary state. The boundary state could be a tight boundary, a relaxed boundary, a boundary containing all inside points, or a boundary containing most of the inside points. The bias parameter can be used in different ways, such as an output error multiplier for one class whereby the error term is multiplied by a constant which is a function of the input class, or as an output target value modifier. The simplest and most effective way to modify the error term is to modify the output target values.

A neural network implementation with two output nodes corresponding to two classes provides four target values to be adjusted. These values correspond to the positive and negative target values for each of the two output nodes and for each of the two classes of inputs. For example, during training, when an inside point is presented for classification, the Inside output node is set to a target value of target (I,p), and the Outside output node is set to a target value of target (O,n). With no bias term, these values would be 1 and −1 respectively. With a bias term the output target values are calculated as:

TABLE 1

Output Target Functions

| | |
|---|---|
| bias) | target(I, p) = 1 + (positive inside |
| bias) | target(I, n) = −1 − (negative inside |
| bias) | target(O, p) = 1 + (positive outside |
| bias) | target(O, n) = −1 − (negative outside |

Only the negative outside bias term is used in normal boundary training. All of the other bias terms are set to zero to set a reference against the negative outside bias, which the net bias parameter is used for. This bias term is set to positive values to force the network to get perfect accuracy on the inside data set. This works because the outside negative target value contributes more to the error term as it gets larger in absolute value.

The positive outside bias term and the negative inside bias term can be used to push the boundary in or out. These bias terms are used to modify the error generated by the outside data points. The bias values are increased to increase the outside point influence and decreased to decrease the outside point influence on the error term Generally, as the outside point influence increases, the boundary is pushed towards the inside points and as the inside point influence increases, the boundary is pushed towards the outside points.

When the network begins training, all of the target bias parameters are set to zero. As mentioned above, during normal boundary training, the net bias parameter is used to set the negative outside bias value. This value remains zero if the inside accuracy remains perfect. This is not usually the case because the outside data can overlap the inside data.

When the inside data goes below 100% accuracy the net bias parameter is increased as a function of the accuracy. As the accuracy decreases, the net bias change increases. Once the net has reached perfect inside accuracy again, the net bias is reduced a smaller amount. The result of these adjustments is a net bias parameter that gets large in early training iterations and generally converges to a smaller value as the net finds a good boundary in later iterations.

In order to end the training loop, the trained neural network must pass the exit condition. There are two possible conditions for detecting the end of training, determining an acceptable boundary and detecting when the weights have stabilized.

The method of boundary convergence used in the present invention employs a minimum accuracy criteria. After a net has been trained for a fixed number of cycles to determine a reasonable bias value and outside accuracy, the net is allowed to train until it meets a minimum inside and outside accuracy.

The stability of the neural network could also be used to detect algorithm completion. The neural network tends to stabilize to some degree early in training. However, after an initial reasonable solution has been found, the boundary can change radically without much change in the network weights. Thus, it is very difficult to detect network convergence by just looking at the net weights. This is particularly difficult if the random pseudo data approach is used, since the net is constantly changing to compensate for different outside data sets. After many trials to determine if the weights converged, it was determined that weight convergence was not generally a good measure of training completion.

The boundary learning algorithm would work in the following way on an illustrative example. A two-dimensional circular region is derived from a random set of points within a circle about the origin of radius equal to 70. If 100 points of that data are taken as the input to the method then N=100. The net bias parameter is set to 0.0. The pseudo data bounding hypercube has dimensions of 200 on each side, centered on the origin. The method generates 100 points of pseudo outside data randomly distributed in the range of −100 to 100 in each dimension. The net is then trained to convergence on the 200 training points. The net is tested and the inside and outside accuracy values of the trained network are used to determine if the net should be trained again.

Assume for example that the outside accuracy was 60% and the inside accuracy was 95%. The net bias parameter is then increased. Since the inside accuracy was not perfect, the cycle is repeated. The new training data generated includes the N original inside points and pseudo data points. The M pseudo data points can be generated in the several ways described hereinabove. The cycle continues until all of the inside points are classified correctly, and the outside accuracy is greater than some threshold. The resulting net is saved as the output of the algorithm.

A variation to this approach is to first generate random pseudo points which are located on a bounding hypercube surface which points by definition are outside the region of the inside data points. This bounding hypercube could be defined for example by the extremum (maximum and minimum) values contained in the inside data set. After the first training iteration, a loose boundary will have formed around the inside data points. A new set of pseudo outside points are generated within the bounding hypercube and are classified by the network. Those pseudo points that are classified as inside are discarded, and the rest kept for another training iteration. In this variation, pseudo data points that would have occupied the inside data region are removed, thus reducing the dependence on the net bias parameter. The net bias parameter is not necessary because the net accuracy on the inside points will be 100% if pseudo data in the inside region are removed. Again the procedure is repeated until a convergence criteria is met. The prior set or sets of pseudo data may be retained for training during each iteration.

Another variation to this approach is to generate data on a bounding hypercube volume in a regular matrix fashion. This ensures an even distribution of pseudo data points, but the number of such points increases very rapidly with the dimension of the input vectors.

Yet another extension of this method is to allow multiple inside classes, in which case the network will have an output node for each inside class plus the one for the outside class. Additional bias parameters can be introduced either as multipliers for the error terms in equation (1), or as additional output target values similar to those listed in Table 1 (target (I, P1), target (O,P1), target (I, P2), etc.) .

Whereas in straight classification, the number of hidden nodes should be kept to a minimum to avoid over training (a term that refers to getting much greater accuracy in training than in testing), a greater number of hidden nodes is generally needed in Biased Data Training. This can be intuitively understood by envisioning in decision space, the classification boundaries. In separating known classes, relatively few simple decision planes or surfaces are needed; but in abnormality detection, the data clusters of the known class(es) must be well bounded on all sides. The flexibility needed to form arbitrary shaped and bounded surfaces generally require more adjustable parameters in the network. The hidden nodes and associated weights provide these parameters.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A system for detecting tool break events while machining a workpiece comprising:

means for generating electrical signals representing vibrations at an interface between a tool and said workpiece;

analog signal processing means for producing from said signals, unipolar, signal energy-versus-time analog waveforms;

digital processor means for a) sampling and digitizing said unipolar output signals, b) screening said sampled and digitized signals for alerting spikes, and c) calculating a plurality of feature vectors for digitized signals at, preceding, and following said alerting spikes, said plurality of feature vectors including mean values, slopes of mean values, standard deviations, and slopes of standard deviations; and a trained neural net for receiving said plurality of feature vectors at an input layer of said trained neural net, said neural net trained iteratively by applying inside data representative of a normal event and outside data representative of an abnormal event, the neural net using an adjustable bias parameter for biasing correct classification of inside and outside data during training and for forming an acceptable class boundary about said inside data and outside data, said trained neural net using said acceptable class boundary to classify said plurality of features as at least one of a break event, a non-break event, and an abnormal event.

2. The system of claim 1 further comprising break indicator means for indicating a tool break event.

3. The system of claim 1 wherein said electrical signals are ultrasonic and low frequency accelerometer signals.

4. The system of claim 1, wherein said trained neural net is classifier net.

5. A method for detecting tool break events while machining a workpiece comprising the steps of;

generating electrical signals representing vibrations at an interface between a tool and said workpiece;

producing from said signals, unipolar, signal energy-versus-time analog waveforms;

sampling and digitizing said unipolar output signals;

screening said sampled and digitized signals for alerting spikes;

calculating a plurality of feature vectors for digitized signals at, preceding, and following said alerting spikes, said plurality of feature vectors including mean values, slopes of mean values, standard deviations, and slopes of standard deviations;

inputting said plurality of feature vectors to an input layer of a neural net, said neural net trained iteratively by applying inside data representative of a normal event and outside data representative of an abnormal event, the neural net using an adjustable bias parameter for biasing correct classification of inside and outside data during training and for forming an acceptable class boundary about said inside data and outside data; and using said acceptable class boundary for classifying said plurality of feature vectors as at least one of a break event, a non-break event, and an abnormal event.

6. The method of claim 5 further comprising the step of indicating a tool break event.

7. The method of claim 5, wherein said trained neural net is a classifier net.

* * * * *